Figure 1:
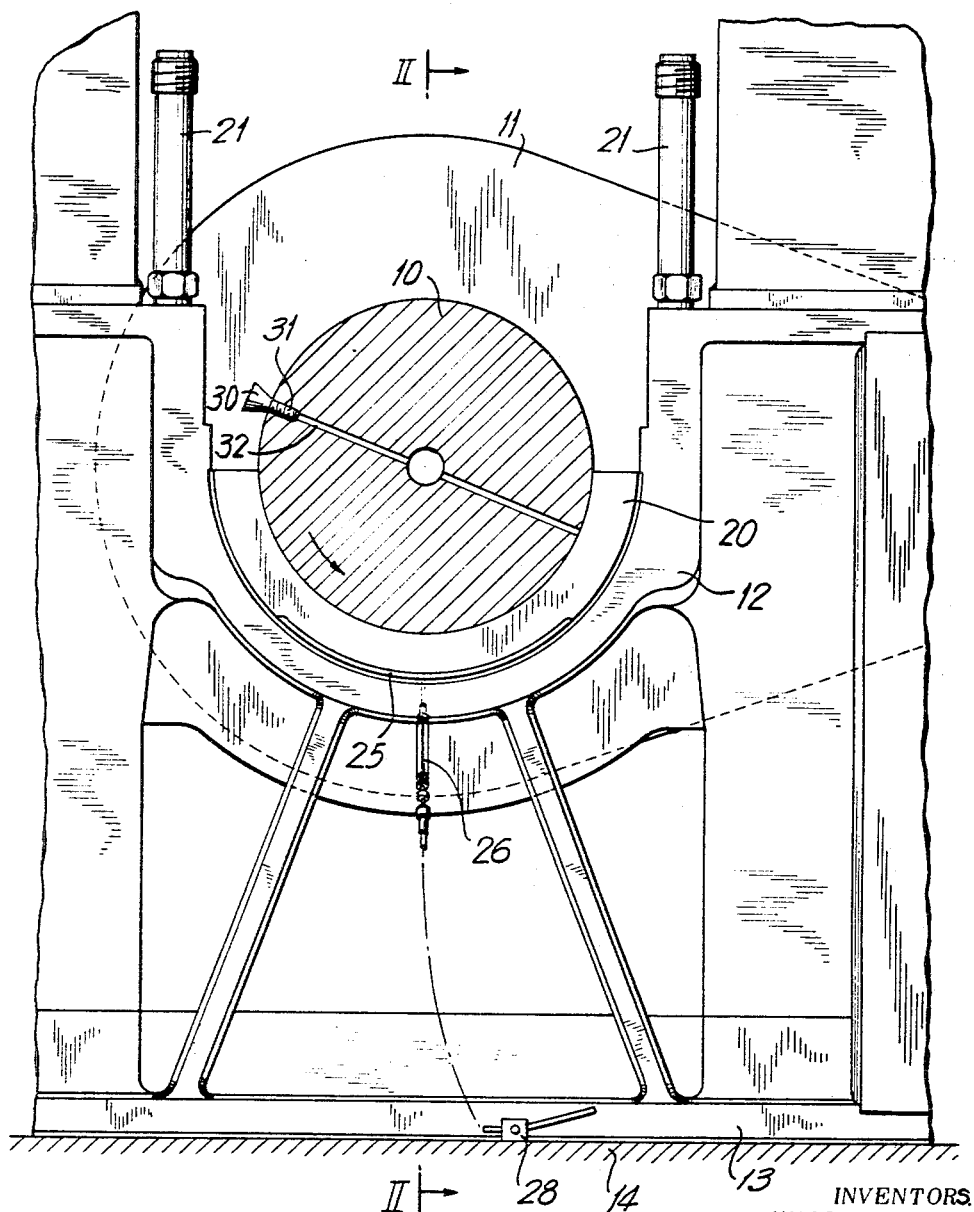

Dec. 3, 1968     H. SCOBEL ET AL     3,413,709
METHOD OF REMOVING CRANKSHAFT BEARING BUSHINGS
FROM INTERNAL COMBUSTION ENGINES
Filed Aug. 23, 1965     2 Sheets-Sheet 1

INVENTORS
HUGO SCOBEL
FRANZ STEIDLE
BY
*Greer Marechal, Jr.*
ATTORNEY

United States Patent Office 3,413,709
Patented Dec. 3, 1968

3,413,709
METHOD OF REMOVING CRANKSHAFT BEARING BUSHINGS FROM INTERNAL COMBUSTION ENGINES
Hugo Scobel, Augsburg, and Franz Steidle, Haunstetten, Germany, assignors to Maschinenfabrik Augsburg-Nurnberg A.G., Augsburg, Germany, a corporation of Germany
Filed Aug. 23, 1965, Ser. No. 481,774
Claims priority, application Germany, Aug. 26, 1964, M 62,218
2 Claims. (Cl. 29—427)

This invention relates to the removable bearing bushings for the crackshafts of large internal combustion engines and, more particularly, to the removal of such bearing bushings, especially the lower bearing bushings singly and individually, without displacing or removing the crankshaft itself.

As will be understood, with piston-type internal combustion engines, and especially large marine diesel engines which may have crankshafts of enormous lengths and bearing pins several feet in diameter, it may be desired to remove and/or replace the individual bearing bushings one at a time without having to remove or even displace the huge crankshaft itself. In situations where the crankshaft bearing pin rests upon a semi-cylindrical lower bearing bushing supported on a stationary bearing block with another semi-cylindrical upper bearing bushing above the bearing pin and held in place by a bearing cap bolted to the supporting bearing block, the removal of the bearing cap and upper bearing bushing is quite simply accomplished, but the difficulty comes in removing the lower bearing bushing without displacing the crankshaft itself or the supporting bearing block on or in which the lower bushing rests.

By the very nature of crankshafts and the fact that each bearing pin thereon is between closely spaced shoulders or eccentric portions of the crankshaft, there is no possibility of removing the lower bushing axially by any of the conventional shaft pulling devices or even expedients used in forcing a collar or wheel off a shaft hydraulically by means of hydraulic pressure applied to internal recesses in the hub of the wheel. Even such expedients as having internal grooves around the bushing into which penetrating oil or rust-dissolving chemicals are injected do not provide satisfactory results in attempting to remove the lower bushings of a crankshaft bearing pin from its bearing block, if for no other reason than because the lower crankshaft bearing bushing is essentially weight-supporting and firmly seated in the bearing block. If it is attempted to provide grooves or similar expedients in the outer surface of the bearing bushing for accommodating cables around the bushing to be attached to a winch or other pulling device in an attempt to rotate the lower bushing out of its seat in the bearing block, such expedients are considerably cumbersome and time consuming and require considerable extra apparatus and equipment in a manner which may not be productive of the desired ease and compactness.

In accordance with this invention, by contrast, there are provided constructions and methods for the ready removal of the lower bearing bushing from between a crankshaft pin and the bearing block on which the bushing seats by injecting hydraulic fluid under pressure into one or more circumferential grooves in the outer surface of the bushing, after removal of the bearing cap and upper bearing bushing, to force the lower bushing into greater friction-engaging contact with the crankshaft bearing pin and to urge the bushing into less firm engagement with the bearing block seat whereby slight rotation of the crankshaft bearing pin will cause the bearing bushing to rotate with the crankshaft and up out of its seat in the bearing block. Similarly, as a further feature of this invention, there is provided temporarily engageable means on the crank pin itself, such as a removable cleat or lug, for engaging one edge of the bearing bushing to force rotation thereof out of the bearing block upon rotation of the crank shaft through no more than perhaps a quarter turn at which point te entire bearing bushing can be removed from beneath the crankshaft and handled as desired.

With the foregoing and additional objects in view, this invention will now be described in more detail, and other objects and advantages thereof will become apparent from the following description, the accompanying drawings, and the appended claims.

Figure 2:
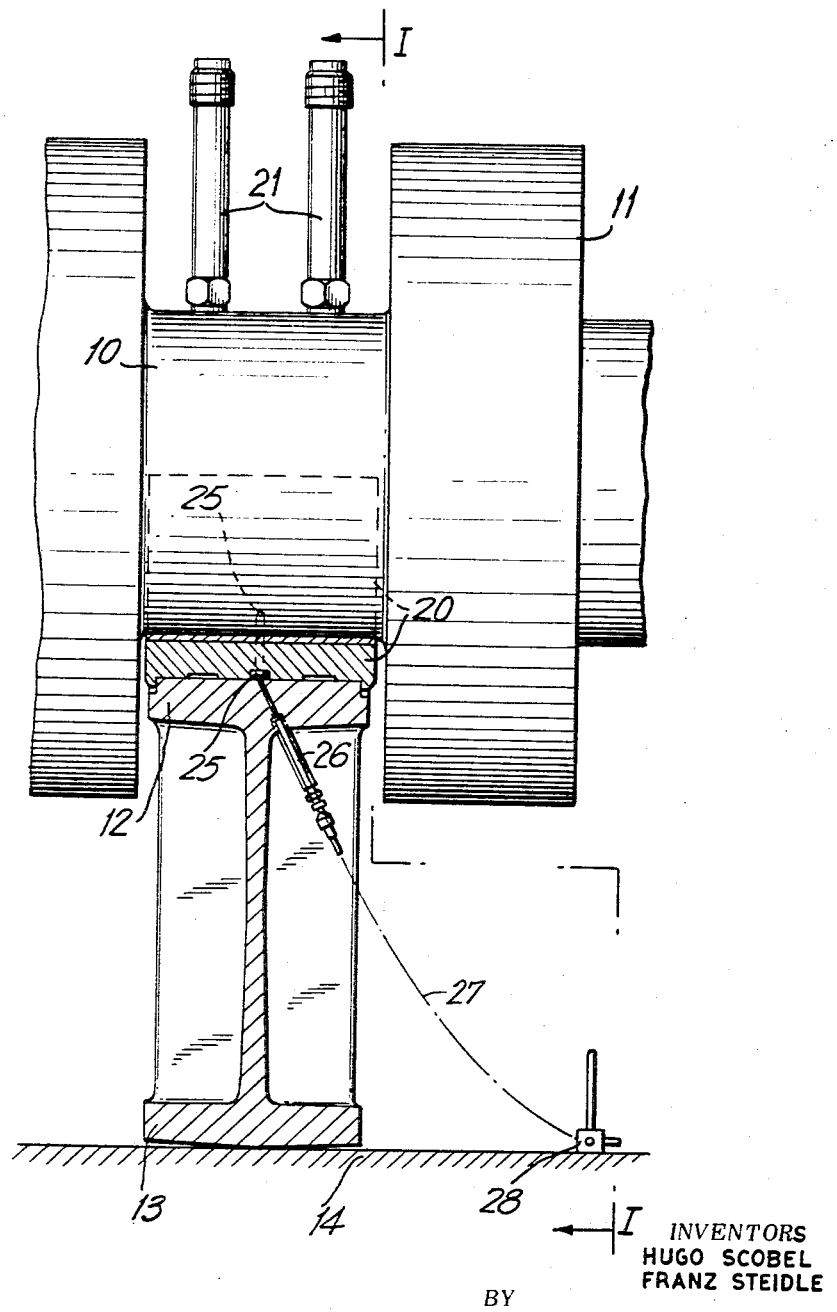

In the drawings:

FIG. 1 is a somewhat diagrammatic view in elevation and taken along line I—I of FIG. 2, of apparatus embodying and for accomplishing this invention and showing, in a plane perpendicular to the axis of the crankshaft, a bearing block and lower bearing bushing, but with the upper bearing bushing and bearing cap already removed; and FIG. 2 is a section along the line II—II of FIG. 1.

Referring to the drawings, in which like reference characters refer to like parts throughout the several views thereof, a preferred or illustrative embodiment of apparatus for practicing this invention is somewhat diagrammatically depicted as having a crankshaft bearing pin 10 and a crankshaft 11 supported, in known manner, on a bearing block 12, the base 13 of which is carried by the foundation or main frame 14 supporting the entire engine as well as other bearing blocks for other bearing pins of crankshaft 11.

The vertical bearing load of crankshaft bearing pin 10 is carried by a semi-cylindrical lower bearing bushing 20, seated in or on and supported by bearing block 12 in known manner. As will be understood, a corresponding and mating upper bearing bushing (not shown) encases the top portion of bearing pin 10 and is held in place, also in known manner, by a bearing cap affixed by bolts or tie rods 21 although the upper bearing bushing and bearing cap, not being relevant to the features of novelty of this invention, are indicated in the drawings as having previously been removed prior to the removal of lower bearing bushing 20.

The readily outer circumferential surface of lower bearing bushing 20 is provided with one or more circumferential grooves or channels 25, preferably extending (as indicated in FIG. 1) throughout about 90° of the arc of bearing bushing 20. An injection conduit 26 is provided through bearing block 12 and in flow communication with groove 25, through which hydraulic fluid (preferably lubricating oil) may be supposed under substantial pressure, as by means of a hose or other conduit indicated by the dot-dash line 27 from pump means 28 (which, because of the temporary or intermittent nature of the device, may satisfactorily be merely a hand pump).

As will be apparent from the foregoing, in operation supplying lubricating oil under pressure through conduit 26 into circumferential grooves 25 in the radially outer surface of lower bearing bushing 20 has the effect of urging the inner bearing surface of bearing bushing 20 more tightly against bearing pin 10 of crankshaft 11 than the radially outer surface of bushing 20 seats against bearing block 12, thus producing a frictional differential tending to make bushing 20 rotate with crankshaft bearing pin 10 upon slight rotation of crankshaft 11. That is, as will be understood, there are a few tenths of a millimeter play (or even a few thousandths) in a worn bearing bushing as between crank pin 10 and bearing block 12.

The utilization of hydraulic pressure in groove 25 is sufficient to urge lower bearing bushing 20 (particularly since upper bearing bushing and bearing cap have already been removed) in tight frictional contact with pin 10, while also introducing an oil film between the outer surface of bearing bushing 20 and the seating surface of bearing block 12, thus tending to produce rotation of bearing bushing 20 out of the seat therefor in bearing block 12 upon rotation of the crankshaft 11 and bearing pin 10 thereof when hydraulic fluid, and particularly lubricating oil, is injected by pump 28 through conduits 27 and 26 into groove 25 and between lower bushing 20 and bearing block 12.

Although the apparatus and technique just described is sufficient to produce rotation of bearing bushing 20 sufficiently out of its seat in bearing block 12 for manual removal thereof from beneath bearing pin 10 of crankshaft 11, it may also be desired to provide an additional mechanical aid to such rotation of bushing 20. Thus, as noted in FIG. 1, a removable cleat or other driving means 30, such as merely a threaded lug, is inserted into a threaded cavity 31 provided in the surface of crank pin 10 (conveniently and satisfactorily as one end of an internal lubricating passage 32 conventionally provided in crankshaft bearing pins).

Cleat 30 is threaded into cavity 31 after removal of the bearing cap and upper bearing bushing so that, as the crank pin 10 is rotated in the direction of the arrow in FIG. 1 and after injection of lubricating oil under pressure into groove 25, the cleat will engage the left edge of lower bearing bushing 20 and aid in the rotation thereof out of bearing block 12, particularly during the last stages of rotation and after bushing 20 has been sufficiently rotated so that the end of groove 25 has passed injection conduit 26. As will be understood, the size of cleat 30 is such that it will pass conveniently clear around upon rotation of the crankshaft and may ultimately be removed. It is to be understood that, throughout the foregoing process, other bearing pins of the crankshaft are fully supported at other bearing block and at other bearing bushings, so that the removal of a particular individual bearing bushing 20 does not deprive the crankshaft 11 of necessary support at other bearing pins.

As will be apparent from the foregoing, there are provided in accordance herewith methods and structures for the ready removal of lower bearing bushings of the bearing pins of internal combustion engine crankshafts in a simple and readily realizable manner requiring no more than the provision of a circumferential groove in the radially outer surface of the bearing bushing and injection conduit means for injecting pressure fluid into such groove to urge the bearing bushing away from the bearing block or seat and into high-friction engaging contact with the crankshaft so that rotation of the crankshaft through no more than perhaps a quarter revolution will turn and rotate the lower bearing bushing out of its seat for ready manual removal as may be desired. Similarly, the provision of a cleat or other driving means temporarily installed on the crankshaft itself to aid the friction drive also further enhances the ease of removal of the lower bearing bushing, and all without expensive or space-consuming or cumbersome additional apparatus to accomplish the desired results.

While the methods and structures herein disclosed comprise preferred embodiments of this invention and preferred arrangement in accordance herewith, this invention is not limited to these precise methods and structures, and changes may be made therein without departing from the scope of this invention which is defined in the appended claims.

What is claimed is:

1. A method for the ready removal of lower semi-cylindrical crankshaft bearing bushing disposed between the bearing pins of an engine crankshaft and a supporting bearing block therefore without removal or displacement of said crankshaft, which comprises the steps of injecting hydraulic fluid under pressure between the radially outer circumferential surface of said bearing bushing and said bearing block for urging the radially inner circumferential surface on said bearing bushing into high friction engagement with said crankshaft bearing pin and for relieving frictional engagement between said radially outer circumferential surface and said bearing block, rotating said crankshaft bearing pin for inducing rotation of said bushing out of engagement between said crankshaft bearing pin and said bearing block, and removing said bushing after said rotation thereof without displacing or removing said crankshaft and while said crankshaft remains supported by other bearing bushings and bearing blocks engaging other bearing pins thereof.

2. A method as recited in claim 1 which also includes the further step of affixing an eccentric cleat to said crankshaft bearing pin for driving engagement with one axial edge of said bearing bushing to aid in the rotation thereof out of engagement between said bearing pin and said bearing block upon rotation of said bearing pin.

References Cited
UNITED STATES PATENTS

| | | | |
|---|---|---|---|
| 1,753,771 | 4/1930 | Buckwalter | 29—427 |
| 1,843,463 | 2/1932 | Tawresey | 29—427 |
| 2,564,670 | 8/1951 | Bratt. | |
| 2,594,810 | 4/1952 | Schaub et al. | 29—401 |
| 2,764,437 | 9/1956 | Bratt | 29—427 XR |
| 2,817,142 | 12/1957 | Boden et al. | 29—427 XR |
| 2,955,350 | 10/1960 | Gardiner. | |
| 3,241,895 | 3/1966 | Fisher | 308—236 |

CHARLIE T. MOON, *Primary Examiner.*